(12) United States Patent
MacLaren

(10) Patent No.: US 6,238,577 B1
(45) Date of Patent: May 29, 2001

(54) SELF-LEVELING WEIR

(75) Inventor: David S. MacLaren, Mayfield, OH (US)

(73) Assignee: Jet, Inc., Cleveland, OH (US)

( * ) Notice: Subject to any disclaimer, the term of this patent is extended or adjusted under 35 U.S.C. 154(b) by 0 days.

(21) Appl. No.: 09/483,398

(22) Filed: Jan. 14, 2000

(51) Int. Cl.⁷ .................................................. B01D 21/24
(52) U.S. Cl. .................. 210/776; 210/242.1; 137/578; 137/101.27
(58) Field of Search .................................. 210/776, 248, 210/538, 540, 242.1, 169, 800; 137/578, 101.25, 101.27

(56) References Cited

U.S. PATENT DOCUMENTS

| | | |
|---|---|---|
| 1,107,391 | 8/1914 | Welch . |
| 3,849,308 | 11/1974 | Westerman .............................. 210/98 |
| 3,970,556 | 7/1976 | Gore ....................................... 210/83 |
| 4,010,103 | 3/1977 | Morgan et al. ................... 210/242 R |
| 4,015,629 * | 4/1977 | Morgan et al. ........................ 137/578 |
| 4,094,338 | 6/1978 | Bauer .................................... 137/578 |
| 4,802,592 | 2/1989 | Wessels ................................. 210/169 |
| 5,104,528 | 4/1992 | Christie ................................. 210/122 |
| 5,143,605 * | 9/1992 | Masciarelli ............................ 210/169 |
| 5,378,376 | 1/1995 | Zenner .................................. 210/776 |
| 5,707,530 | 1/1998 | Broussard, Jr. ....................... 210/703 |
| 5,766,459 | 6/1998 | Adams, Jr. ......................... 210/195.4 |
| 5,770,081 | 6/1998 | McKinney ............................ 210/620 |
| 5,804,081 | 9/1998 | DeGesero et al. .................... 210/741 |
| 5,846,423 | 12/1998 | Jensen .................................. 210/602 |

FOREIGN PATENT DOCUMENTS

R 2 560 903 A1  9/1985 (FR) .

* cited by examiner

*Primary Examiner*—Robert Popovics
(74) *Attorney, Agent, or Firm*—Roberts Abokhair & Mardula, LLC

(57) ABSTRACT

The present invention provides a barrier over which waste water must flow in order to reach the outlet of a wastewater treatment plant. The barrier provided by the weir allows wastewater to exit the plant, while keeping solids that are in suspension to remain. The weir has a scum baffle mounted on its front that acts as a shield against solids that are floating on the surface of the wastewater. The self-leveling ability of the weir is provided by the use of two floats and a coupling to the outlet pipe that has rotational freedom. The floats are mounted on either side of the weir in such a way so that they are partially submerged in the wastewater. The buoyant forces that result cause the weir to align itself parallel to the surface of the water at all times. One advantage of the present invention is that it is self-adjusting, thus eliminating the need for calibration or adjustments after installation. This weir also provides consistent performance even if the wastewater treatment plant is installed or settles to an out of level state.

9 Claims, 3 Drawing Sheets

SELF-LEVELING WEIR

FIELD OF THE INVENTION

The present invention relates generally to a self-leveling weir. In particular, the present invention is directed toward a self-leveling weir used for a wastewater plant outlet pipe that eliminates the need for calibration or adjustment after installation and that provides consistent performance even if the wastewater treatment plant is installed or settles to an out of level state.

BACKGROUND AND DESCRIPTION OF THE PRIOR ART

Wastewater treatment plants occasionally are installed or settle to an out of level state. This can cause improper performance of existing weir systems if they are not properly calibrated or adjusted. Typical systems use weir plates installed in such a manner that they can be adjusted up or down to restore them to the proper level when a tank settles out of line.

U.S. Pat. No. 5,104,528 to Christie discloses a floating decanter apparatus for decanting supernatant from a vessel or basin without drawing floating solids or scum (See moving tube 68, FIG. 2). The apparatus includes a weir with a float for buoyantly supporting the weir in the basin. However, the float is not utilized for self-leveling purposes, but rather to move the weir in a vertical direction.

U.S. Pat. No. 3,849,308 to Westerman provides a container floatably supported on a liquid surface between exterior floats (col. 2, third paragraph). While floats are utilized in this apparatus, they are not utilized in the same manner as the present invention.

U.S. Pat. No. 1,107,391 to Welch shows floats 18 and screens 19. The floats are utilized on the device to automatically maintain itself at a predetermined height relative to the heavier liquid so that the lighter liquid will be collected by the device and carried away for future use. This apparatus is mainly utilized for separating oil from the surface of water.

U.S. Pat. No. 4,010,103 to Morgan, et al. shows a skimmer which automatically pivots in response to different oil levels. This apparatus utilizes floats in an automatic oil/water separating device.

U.S. Pat. No. 5,378,376 to Zenner ( see particularly FIG. 4) shows a floating weir which "automatically and continually senses"(col. 6, last paragraph). This system is directed to vertical movement of the weir rather than the leveling adjustment.

U.S. Pat. No. 4,802,592 to Wessels shows a floating weir in a floating box in a liquid skimmer apparatus. This system is also directed to fluid level control rather than a self-leveling weir.

French Patent No. 2,560,903 to Vidon shows a floating collector that prevents floating objects from entering the discharge tube. This configuration is also directed to the vertical movement of the apparatus.

U.S. Pat. No. 3,970,556 to Gore shows a floating skimmer (claim 1) for cleaning the surface of the liquid around the skimmer. Floatation and ballast chambers in the outer body are utilized to regulate the level of floatation of the weir. Again, the floatation mechanism is utilized in relation to vertical movement with the level of fluids in the apparatus.

U.S. Pat. No. 4,094,338 to Bauer shows a constant discharge rate device of general interest. The apparatus utilizes floatation means around the weir.

None of these references disclose the use of floats in a self-leveling weir that is a part of the apparatus for sludge separation. Unlike the prior art, the present invention is not drawn to the utilization of the floats to control the vertical movement of the weir. Instead, the floats of the invention are utilized in a self-leveling rotational movement of the weir about a fixed outlet pipe in order to adjust the horizontal leveling of the weir.

SUMMARY OF THE INVENTION

The present invention provides a barrier over which waste water must flow in order to reach the outlet of a wastewater treatment plant. The barrier provided by the weir allows wastewater to exit the plant, while keeping solids that are in suspension to remain. The weir has a scum baffle mounted on its front that acts as a shield against solids that are floating on the surface of the wastewater. The self-leveling ability of the weir is provided by the use of two floats and a coupling to the outlet pipe that has rotational freedom. The floats are mounted on either side of the weir in such a way so that they are partially submerged in the wastewater. The buoyant forces that result cause the weir to align itself parallel to the surface of the water at all times.

One of the objects and advantages of the present invention is that it is self-adjusting, thus eliminating the need for calibration or adjustments after installation. The weir of the invention provides consistent performance even if the wastewater treatment plant is installed or settles to an out of level state.

It is another object of the invention to provide a self-leveling weir with a scum baffle to prevent solids from leaving the wastewater plant.

The design of the invention is also such that scum baffles of greater or lower height above or below the waterline may be attached under certain circumstances, such as to handle scum buildup or particle flotation below the liquid surface.

DETAILED DESCRIPTION OF THE INVENTION

Figure 1:
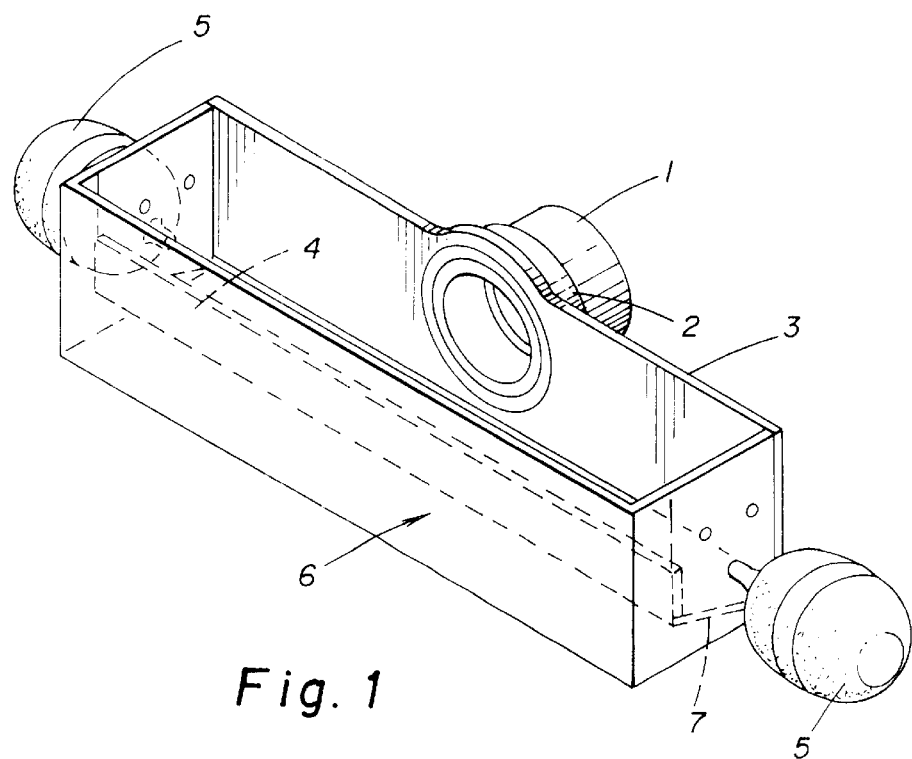
FIG. 1 illustrates a perspective view of the self-leveling weir and scum baffle of the present invention.
Figure 2:
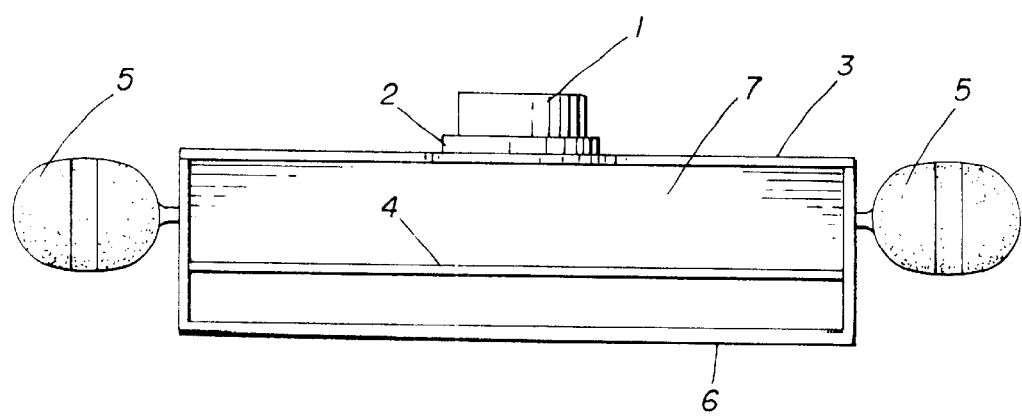
FIG. 2 illustrates a top view of the self-leveling weir and scum baffle of the present invention.

FIGS. 1 and 2 illustrate a basic embodiment of the self-leveling weir. The outlet 1 of a wastewater treatment plant has a rotatable coupling 2 about which weir box 3 is mounted for rotation. The weir box 3 has a bottom surface or wall 7, spaced front and back surfaces or walls, and spaced side surfaces or walls. Liquid at a level above the front wall 4 of the weir box 3 flows over the front wall 4 and out the outlet 1. Floats 5 are mounted on opposite side walls of weir box 3 in such a manner, e.g. identical floats positioned at a uniform vertical location relative to the horizontal top of front wall 4, as to cause buoyancy forces acting on the floats to cause the weir to rotate to maintain a position level with the water surface. Other known buoyant means can be used, and mounting locations for the buoyant means are not limited to the side walls, so long as opposing buoyant forces act on the weir box 3 at locations perpendicular to the axis of rotation of the rotatable coupling 2.

Scum baffle 6 is mounted in close proximity to front wall 4 and extends vertically above the top and below the bottom of the front wall 4 of the weir over a range of anticipated liquid levels so as to prevent floating solids from entering the weir. Subsurface liquid flows under the scum baffle 6 and then over the front wall 4 of the weir.

Figure 3:
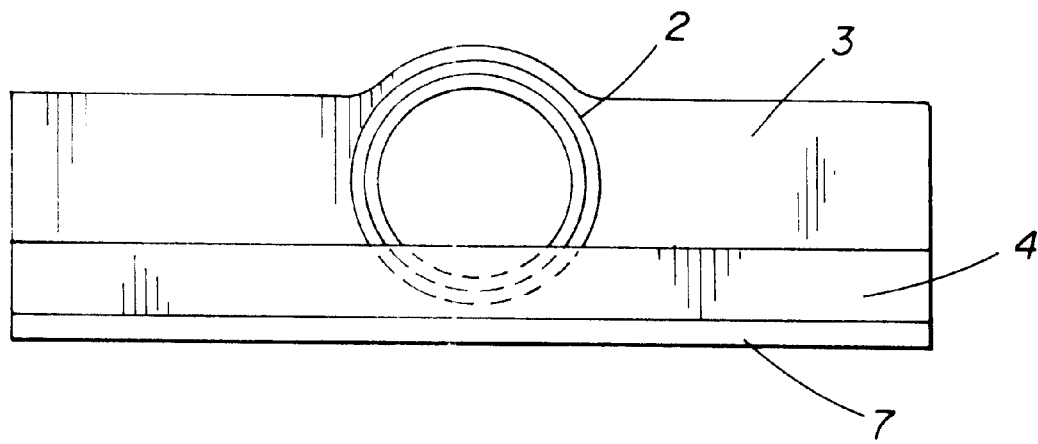
FIG. 3 illustrates a front view of the rotatable weir of the present invention.
Figure 4:
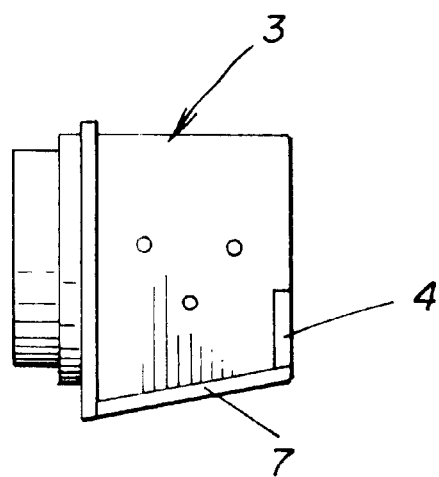
FIG. 4 illustrates a side view of the rotatable weir of the present invention.

As shown in FIGS. 3 and 4, the front wall 4 of weir box 3 extends above the vertical position of the lower edge of outlet 1 to help ensure the outward flow of liquid. The bottom wall 7 of the weir box 3 may be sloped so as to direct liquid towards the outlet 1 and provide a collection reservoir for any particles that slip over the weir.

Figure 5:
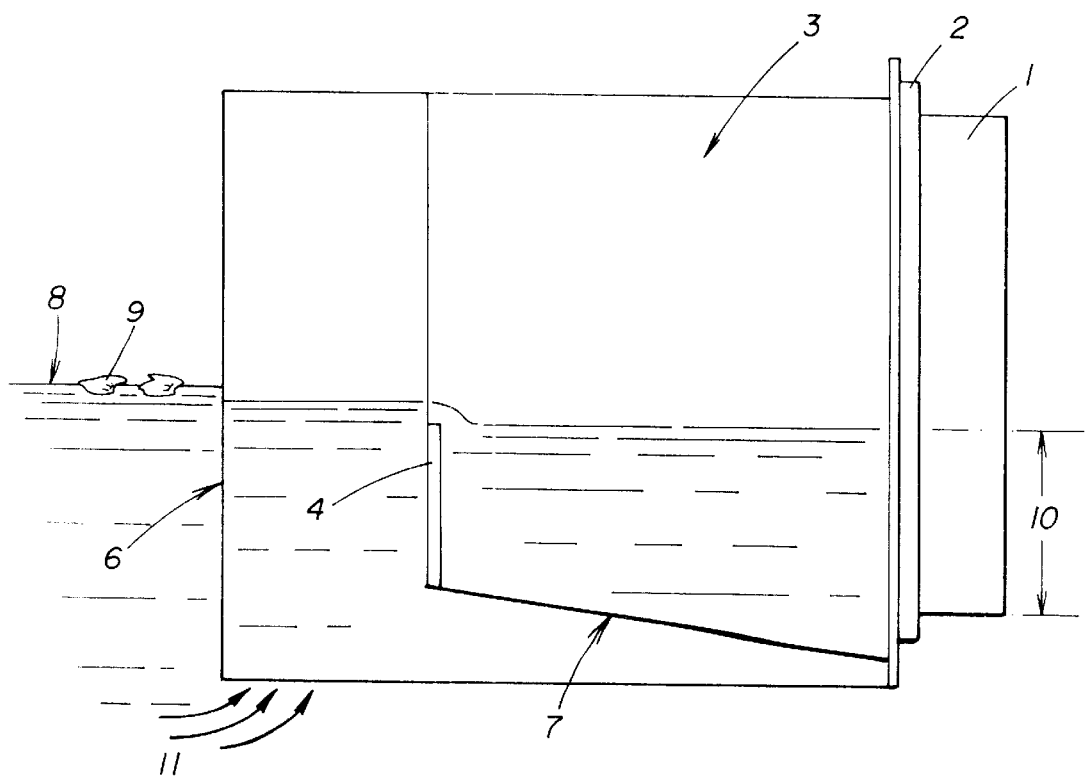
FIG. 5 illustrates a side view of the weir in use.

In operation, the liquid level will act on floats 5 uniformly, causing the weir to rotate on coupling 2 about outlet 1 to maintain a level of the weir consistent with the liquid level. As shown in FIG. 5, scum 9 on the liquid surface 8 will be blocked by scum baffle 6. Scum-free liquid 11 flowing under the scum shield 6 will then flow over front wall 4 of the weir box 3 and through the outlet 1.

I claim:

1. A self-leveling weir comprising:

a fixed outlet having an opening for a liquid;

a rotatable coupling attached to said outlet at said opening;

a weir box having a bottom surface, spaced front and back surfaces, and spaced side surfaces, wherein said back surface is attached to said rotatable coupling to allow rotation of the weir box about said fixed opening and said back surface has a hole substantially coextensive with said opening; and opposing buoyant means attached to said weir box at a distance perpendicular to an axis of rotation of said rotatable coupling.

2. The self-leveling weir of claim 1, wherein said buoyant means are floats at least partially submerged in said liquid.

3. The self-leveling weir of claim 1, wherein said opposing buoyant means are attached to said spaced side surfaces.

4. The self-leveling weir of claim 1, further comprising a scum baffle horizontally spaced from said front surface in a direction opposite from said back surface and vertically extending above a top edge of said front surface and below a bottom edge of said front surface.

5. The self-leveling weir of claim 1, wherein said front surface has a straight top edge that is urged by said opposing buoyant means into a horizontal position parallel to a surface level of said liquid.

6. The self-leveling weir of claim 5, wherein said top edge of said front surface is positioned at a vertical level above at least a portion of said outlet and said hole.

7. The self-leveling weir of claim 6, wherein said bottom surface is sloped so as to direct liquid which comes over said weir towards said outlet and said hole.

8. A method of leveling a weir, comprising:

providing the self-leveling weir of claim 1, providing a liquid level sufficient to act on said opposing buoyant means.

9. The method of leveling a weir of claim 8, further comprising blocking the flow of scum over the weir by providing a scum baffle adjacent the front wall of the weir.

* * * * *